(12) United States Patent
Priou et al.

(10) Patent No.: US 6,472,492 B2
(45) Date of Patent: Oct. 29, 2002

(54) PROCESS FOR THE MANUFACTURE OF MULTIFUNCTIONAL POLYORGANOSILOXANES (POSS) BY DEHYDROCONDENSATION AND HYDROSILYLATION, AND DEVICE FOR CARRYING OUT THIS PROCESS

(75) Inventors: Christian Priou, Villeurbanne (FR); Robert Violland, Lyons (FR)

(73) Assignee: Rhodia Chimie, Boulogne Billancourt Cedex (FR)

( * ) Notice: Subject to any disclaimer, the term of this patent is extended or adjusted under 35 U.S.C. 154(b) by 0 days.

(21) Appl. No.: 09/861,043

(22) Filed: May 18, 2001

(65) Prior Publication Data

US 2001/0047070 A1 Nov. 29, 2001

Related U.S. Application Data

(63) Continuation of application No. 09/230,752, filed as application No. PCT/FR97/01458 on Aug. 6, 1997, now abandoned.

(30) Foreign Application Priority Data

Aug. 6, 1996 (FR) ............................................. 96 10086

(51) Int. Cl.[7] ................................................. C08G 77/08
(52) U.S. Cl. ............................... 528/15; 528/29; 526/65
(58) Field of Search ......................... 528/15, 29; 526/65

(56) References Cited

U.S. PATENT DOCUMENTS 6,271,331 B1 * 8/2001 Gay et al. ..................... 528/15

FOREIGN PATENT DOCUMENTS

WO   WO 96 16126   5/1996   ........... C08L/83/06

* cited by examiner

*Primary Examiner*—Margaret G. Moore

(57) ABSTRACT

The invention concerns the manufacturing, on an industrial scale, of multifunctional polyorganosiloxanes. The process of the invention is a (semi) continuous method of manufacturing polyorganosiloxanes with Si-alkyl and SiOR (R-alkyl) functionality, in which: 1. A dehydrogenocondensation reactor A is continuously fed with one polyorganosiloxanes with SiH, a ROR alcohol and platinum; 2. The gas formed is evacuated and recuperated continuously by eliminating the hydrogen $H_2$ it contains and by recycling the ROH by condensation; 3. The polyorganosiloxanes with SiH and with SiOR derived from 1., is immediately transferred in a hydrosilylation reactor B, to recuperate finally one polyorganosiloxanes with Si-alkyl and with SiOR.

16 Claims, 1 Drawing Sheet

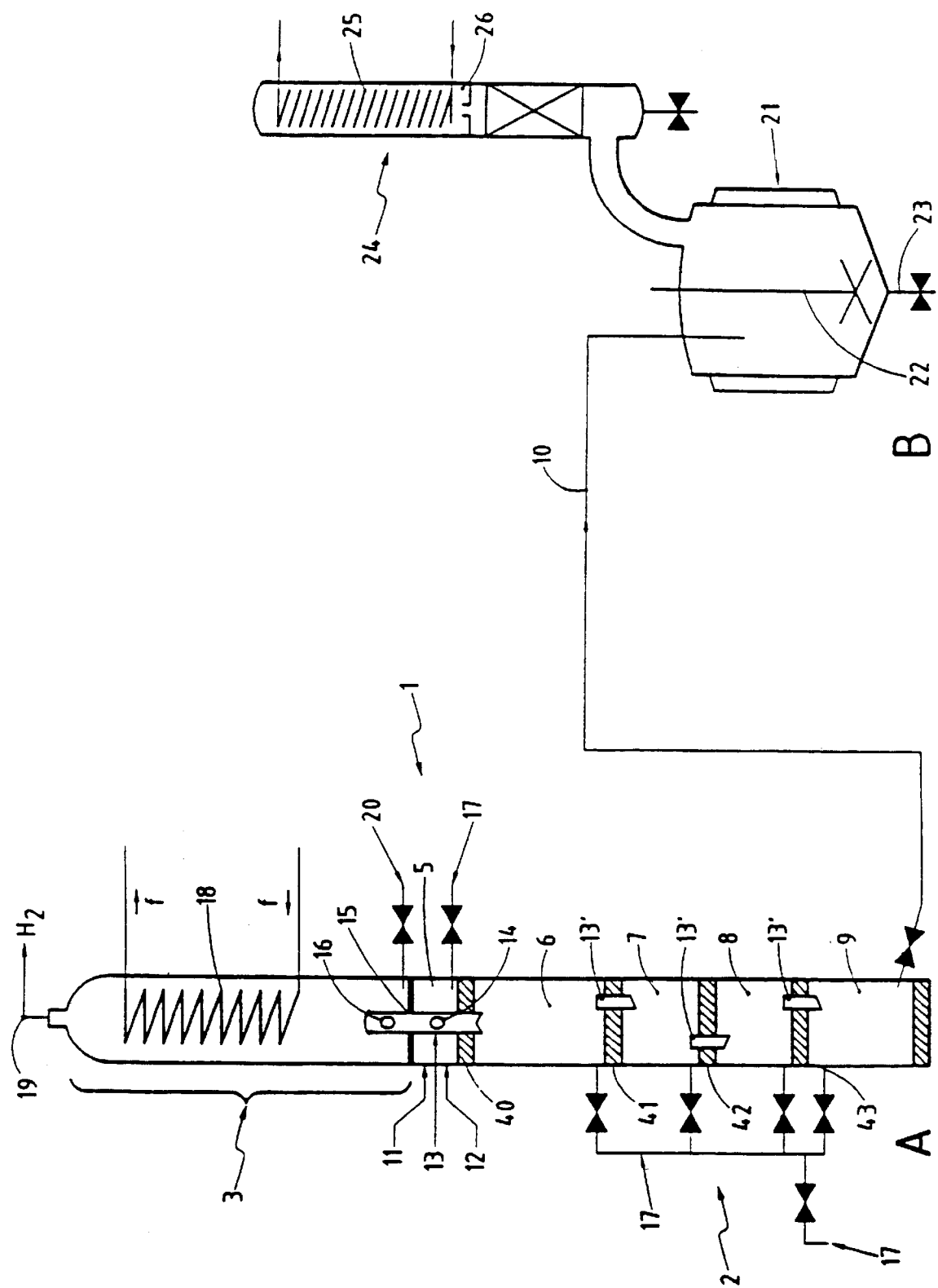

PROCESS FOR THE MANUFACTURE OF MULTIFUNCTIONAL POLYORGANOSILOXANES (POSS) BY DEHYDROCONDENSATION AND HYDROSILYLATION, AND DEVICE FOR CARRYING OUT THIS PROCESS

This application is a continuation application Ser. No. 09/230,752 filed on May 3, 1999, abandoned, which is a 371 of PCT/FR97/01458, filed Aug. 6, 1997.

The field of the invention is that of the functionalization of linear or cyclic silicones, in particular polyorganosiloxanes, consisting of M, D, T and optionally Q units.

The POSs to be functionalized, which are more specifically addressed in the context of the invention, are linear or cyclic polyorganohydrosiloxanes. It is the SiH groups of these POSs which serve as attachment points, to functionalities intended to substitute these POSs, in order to give them specific properties, for example anti-adhesion, lubrication, compatibilization, etc., which are all properties that are desired in the diverse and varied applications of silicones.

The present invention relates to the industrial-scale manufacture of multifunctional POSs. In such a context, it is clear that continuous or semi- continuous operating modes are more suited to the industrial requirements of viability and productivity than in the batchwise mode.

The present invention is also directed towards an industrial unit for the manufacture of multifunctional PoSs, in particular according to the process outlined above.

The actual principle of the multi-functionalization of POSs is described in the prior international patent application PCT WO 96/16125. That document discloses the preparation of a POS II containing Si—OEt and Si—H functionality, by dehydrocondensation of polymethylhydrosiloxane α-ω-Si(Me)$_3$ containing, for example, 50 MeSiHO$_{2/2}$ units. In place of the ethoxy functionality, other alkoxyls are envisaged, such as, e.g. isopropoxy.

The dehydrocondensation is carried out by placing the POS (I) containing SiH in contact with an alcohol which is a precursor of the alkoxy functionality, in the presence of a platinum-based catalyst.

After this dehydrocondensation, a fraction of the starting SiH groups is found to be substituted with an alkoxy residue.

The POS (II) thus obtained is then subjected to hydrosilylation of an olefin, such as octene, by the remaining SiH groups and in the presence of the starting platinum catalyst.

It could thus be observed that the dehydrocondensation of POS (I) containing SiH, with excess alcohol and in the presence of a platinum catalyst, slows down considerably to about a 66% degree of conversion.

Faced with the problem of industrialization of this process for the multi-functionalization of POSs containing SiH groups, the Applicant has had to confront a certain number of technological and technical difficulties, which will be outlined below.

The general specifications sheet for an industrial process for the manufacture of multi-functionalized POSs comprises at least four main requirements: productivity and viability, the quality of the finished products, safety, and the ease of implementation.

As regards the productivity and viability, it is clear, as already indicated above, that a continuous, or even semi-continuous, operating mode must be envisaged.

One of the deciding factors of the quality of the multi-functionalized POSs considered is based on controlling the degree of conversion of the SiH groups by dehydrocondensation (degree of substitution by a first type of functionality). In the case where the alcohol is used as dehydrocondensation reactant, it is important to control the degree of partial alkoxylation in order to ensure its reproducibility. The only close prior art in this respect, namely application PCT WO 96/16125, provides no solution (nor even the start of a solution) since the examples it gives are laboratory tests performed, in a batchwise manner, in 500 ml three-necked round-bottomed flasks.

The industrial safety aspect is also very constraining in this multifunctionalization process, for several reasons. The first is that the release of hydrogen which is a feature of the dehydrocondensation is an obvious menace which should be suppressed. The second arises from the fact that the reaction intermediate POS (II) containing Si—OR and containing Si—H (reactant =alcohol) is an oil which contains a large proportion of SiH, in the presence of platinum catalyst which is still active. This is a potentially dangerous mixture since the possibility of the reaction restarting and thus producing hydrogen in an unexpected and uncontrolled manner cannot be excluded, which represents, under such conditions, a high risk.

There is also an additional technical difficulty associated with the phenomena of intense foaming, induced by the hydrogen produced during the dehydrocondensation.

The examples of the process for the multi-functionalization of POSs containing SiH, as given in the closest prior art WO 96/16125, are batchwise laboratory tests, which do not take account of the industrial preoccupations outlined above.

Given this state of affairs, one of the essential aims of the present invention is to improve the process for the multi-functionalization of POSs described in WO 96/16125 in order to make it into an industrial process for the manufacture of multi-functional POSs which satisfies the requirements of viability and productivity, of quality of finished product, of safety and, lastly, of ease of implementation.

Another essential aim of the present invention is to provide an industrial unit for the manufacture of multifunctional POSs by dehydrocondensation/hydrosilylation, this device needing to be economical, reliable, of good performance and suited to the above-targeted manufacturing process.

These aims, among others, are achieved by the present invention, which relates, firstly, to a process for the continuous or semi-continuous manufacture of multifunctional polyorganosiloxanes (POS) (III) from POS (I) comprising SiH groups and according to a reaction mechanism involving a dehydrocondensation which allows the functionalization of the said POS (I) by the functionality (Fo$_1$) and a hydrosilylation of at least one unsaturated compound which is a precursor of a functionality (Fo$_2$) on the POS (III), characterized in that it consists essentially in:
continuously supplying at least one continuous reactor A with:
at least one POS (I) containing SiH groups,
at least one functional reactant (HXR) containing labile hydrogen, preferably an alcohol and/or a thiol (X=O or S), the said
reactant preferably being in excess relative to (I),
and a catalyst comprising a product chosen from transition metals—platinum being particularly preferred,
the said reactor A being the site of a dehydrocondensation leading, in particular:
to a POS (II) comprising residual SiH groups and SiFo$_1$ groups (Fo$_1$=XR), to reactant HXR,
go and to a gas containing hydrogen and, optionally, gaseous reactant HXR,
allowing the continuous removal and recovery, from the reactor A, of the gas containing hydrogen as it is formed,
optionally collecting the liquid reaction medium provided that this medium contains, in particular, POS II containing SiH/SiFo$_1$ groups and the catalyst,
transferring the said liquid reaction medium from reactor A to at least a reactor B for hydrosilylation of at least one unsaturated functional compound by the residual SiH groups of the POS (II), so as to obtain the POS (III) containing SiFo$_1$ and SiFo$_2$ groups,
allowing the above-targeted hydro- silylation to proceed, recovering the POS (III) containing SiFo$_1$/SiFo$_2$ groups which is thus formed.

After long and laborious research, the Applicant has, to its credit, been able to demonstrate that the problem of industrialization of a multifunctionalization of POS involved performing a continuous dehydrocondensation, by providing for instantaneous and continuous removal and recovery of the hydrogen as it is formed and, moreover, by evacuating, as early and as quickly as possible, the dangerous POS (II) intermediate towards the other hydrosilylation reactor B in order to neutralize it and make it harmless. In other words, the hydrogen is removed and the reaction intermediate (II) is consumed as it is formed.

These advantageous process modes are guarantees:
of productivity/viability→continuous operation,
of quality→control of the degree of conversion of the POS (I) into POS (II),
of safety→maximum containment of the hydrogen risk, and of ease of operation.

Incidentally, the process according to the invention conveniently allows the heat of reaction to be removed, while at the same time correctly controlling the temperature of the reaction bulk.

The bulk evacuation of hydrogen recommended provides a solution to the prohibitive problem of foaming.

Another advantage of the invention, and not the least of which, relates to the economy of this process.

The gas produced by the dehydrocondensation comprises reactant HRX—preferably an alcohol ROH, in vapour form. According to an advantageous mode of the invention, this gas is subjected to a treatment for separation of the hydrogen, preferably by condensation of the vapours of the reactant HRX (e.g. of alcohol).

In the present specification, R represents a hydrocarbon residue consisting of a linear or branched alkyl radical containing from 1 to 15 carbon atoms and preferably containing from 1 to 6 carbon atoms.

In the specific case in which the reactant containing labile hydrogen is an alcohol, the functionality Fo$_1$ is an alkoxyl, and in the case where the unsaturated compound to be hydrosilylated is an olefin, Fo$_2$ is a functional hydrocarbon radical corresponding to the same definition as that given for W in formula (II) of the unit constituting the functionalized PoSs, as described in WO 96/16125. This PCT application is, moreover, incorporated in its entirety into the present application by way of reference. The functionalities Fo$_1$ are, for example, methoxy, ethoxy and (iso)propoxy. The functionalities Fo$_2$ are, for example: an alkyl radical (i') consisting of octyl, dodecyl, undecyl and tridecyl; an alkenyl radical (2i') consisting of hexenyl and dodecenyl; an unsaturated cycloaliphatic radical (3i') consisting of cyclohexenyl, l-methyl-l-cyclohexenyl, optionally linked to the silicon via a —CH$_2$—CH$_2$, —CH$_2$—CH(CH$_3$)— or —(CH$_2$)$_3$— residue.

In order to provide further details regarding the process according to the invention, it may be indicated that reactor A is preferably supplied substantially simultaneously with POS (I) containing SiH and with functional reactant HXR, the catalyst being included in the POS (I) and/or the reactant HXR. Advantageously, the use of a solution of catalyst in the reactant HXR is favoured in practice.

Simultaneously supplying with POS (I) and with reactant containing labile hydrogen—such as an alcohol (ethanol)—in this way allows the safety to be improved since the bumping of the reaction and the release of hydrogen associated therewith can thus be controlled and tempered.

In order to optimize the kinetics of the dehydrocondensation reaction, preheating of at least one of the starting reactants, namely: POS (I), HXR and catalyst, to a temperature of between 30 and 100° C., preferably between 40 and 80° C., is ideally envisaged.

In accordance with the invention, one of the key points which makes it possible to ensure the reproducibility of the degree of conversion of the POS (I) into POS (II) and to ensure minimization of the potential risk associated with this unstable POS (II) involves:
carrying out the dehydrocondensation reaction in the continuous reactor A,
establishing a residence time which is just sufficient to obtain the desired degree of conversion,
and adjusting the reaction kinetics by controlling the operating parameters of the process (supply of reactants, temperature, etc.).

This residence time depends directly on the moment of transfer of the POS (II) into the reactor B. Thus, according to a preferred characteristic of the invention, the degree of substitution of the SiH groups with Fo$_1$ is measured and/or calculated and the POS (II) is transferred from the dehydrocondensation reactor A to the hydrosilylation reactor B once the degree of substitution of the SiH groups with Fo$_1$, expressed in mol%, is greater than or equal to 45, preferably to 55 and, even more preferably, is between 60 and 70. This is one of the means available, among others, for regulating the degree of substitution.

In the context of the actual control of the process according to the invention, the path from the degree of substitution to the degree of conversion may be followed, for example, by means of measuring the hydrogen released. The flow rate thus measured makes it possible, by calculation, to gain access directly to the degree of substitution. An alternative would be to set up continuous analysis of the POS (II).

In any case, instantaneous knowledge of the degree of substitution allows this degree to be adjusted by varying the operating parameters, in particular the residence time of the POS (I) and (II) in the reactor A and/or the reaction temperature and/or the supply rates of POS (I), of functional reactant HXR and of catalyst.

By providing for condensation of the vapours of volatiles, produced by the stripping effect brought about by the leaving hydrogen, it is possible to remove the heat of the reaction. This removal of heat takes place by means of vaporization of the volatile reactant fed continuously and by means of the condensation itself, given that, in addition, the recovered reactant condensate is recycled. The system is simple and self- regulating. Thus, the reaction temperature is regulated, for example, to about 70–71° C. This regulation is another important factor for stabilizing the degree of conversion of the POSs (I) into POS (II), at the virtually asymptotic value of about 66%.

According to a preferred arrangement of the invention, the step of hydrosilylation of at least one unsaturated compound which is a precursor of $F_{o2}$ is carried out according to a continuous, semi-continuous or continuous mode, preferably continuously.

As regards the products used and the products obtained by this process, those disclosed in patent application PCT WO 96/16125 are preferred.

For further details, it will be pointed out that the multifunctional POSs (III) obtained by the process according to the invention are those comprising, per molecule:

α) on the one hand, at least one functional siloxy unit (I):

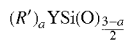

where R' is, in particular, a $C_1$–$C_6$ alkyl radical, Y is a $C_1$–$C_5$, preferably $C_1$–$C_6$, alkoxy radical, and a =0, 1 or 2;

on the other hand, at least one other functional siloxy unit (II):

where b =0, 1 or 2 and W is a $C_2$–$C_{30}$ hydrocarbon group, linked to the silicon via an Si—C bond, chosen from the following groups:

(i) a linear or branched alkyl group comprising at least 7 carbon atoms, (2i) a linear or branched $C_2$–$C_{20}$ alkenyl group containing one or more double bonds in and/or at the end(s) of the chain(s), the said double bonds preferably being conjugated and/or combined with at least one activating group located in an α position and advantageously consisting of an oxide ether or a thioether, (3i) an unsaturated aliphatic mono- or bicyclic group containing 5 to 20 cyclic carbon atoms and one or two ethylenic double bond(s) in the ring, optionally substituted with one or two linear or branched $C_1$–$C_3$ alkyl group(s), the said cyclic group optionally being linked to the silicon via a linear or branched $C_2$–$C_{10}$ alkylene radical, (4i) a mercaptoalkyl group of formula —R$^1$—S—A (4i)

in which
* $R^1$ represents a linear or branched $C_2$–$C_{10}$ alkylene radical optionally comprising at least one oxygen-containing hetero atom or an alkylene-cycloalkylene radical in which the alkylene part has the same definition as that given just above and the cyclic part contains 5 to 10 carbon atoms and is optionally substituted with one or two linear or branched $C_1$–$C_3$ alkyl group(s),
* A corresponds:
→ either to hydrogen,
→ or to a masking group M connected to S via a labile bond under given conditions and allowing the replacement of M with H or the creation of an active species —R$^1$—S•;

(5i) a group comprising a polysulphuric species and corresponding to the following formula:

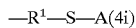

in which

* x =1 to 6,
* $R^2$ having the definition as $R^1$ above,
* $R^3$ is a linear or branched $C_1$–$C_{10}$ alkyl, (6i) a group containing at least one ring, in which at least one of the elements is a sulphur atom, and corresponding to the formulae below:

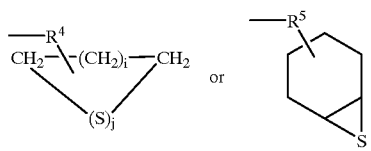

in which
* i =0, 1 or 2 and j =1 to 6
* the substituents $R^4$ and $R^5$ are divalent radicals as defined above for $R^1$, (7i) a sulphoxide group of formula:

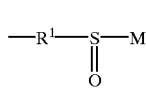

(7i)

in which the symbol $R^1$ and M have the definitions given above for formula (4i); γ) and optionally at least one unit (III):

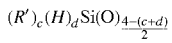

where c =0, 1, 2 or 3, d =0 or 1 and c +d ≦3.

To return to the implementation of the process according to the invention, it will be pointed out that, as regards the reagent containing a labile hydrogen, $C_1$–$C_{10}$, preferably $C_1$–$C_6$, alcohols are preferred. However, this does not exclude the use of their corresponding thiols.

As regards the unsaturated compound which is a precursor of $F_{o2}$, it is selected from compounds of appropriate structure capable of leading, by hydrosilylation, to the functionalities corresponding to groups (i) to (7i) defined above.

Preferably, the unsaturated precursor compounds are selected from olefins capable of leading to the functionalities $F_{o2}$ chosen from the groups (i), (2i) and (3i) defined above.

In practice, the catalyst is based on platinum. It may be, for example, platinum in oxidation state 0, such as the Karstedt catalyst, but also platinum in oxidation states II or IV. Another alternative is to use platinum catalysts supported on inorganic charges such as, e.g. carbon black, silica, alumina, etc.

It should be noted that, according to a variant of the process of the invention, a step of recovery of the gaseous mixture formed during the hydrosilylation may be envisaged. Such a gaseous-mixture is, in fact, formed of the vapours of the volatile reactant compounds of the dehydrocondensation (e.g. alcohol) or of the hydrosilylation (e.g. alkene). The said vapours are preferably condensed in order to recover them in liquid form and optionally recycle them in the process.

The present invention relates, secondly, to a device for carrying out, in particular, the process described above, the said device being characterized in that it comprises at least one continuous dehydrocondensation reactor A:
  • connected to at least one pipe for supplying with starting reactants (POS (I) containing SiH groups/reactant containing labile hydrogen/catalyst), comprising:

means for the rapid evacuation and rapid recovery of the gas formed during the dehydrocondensation, p2 optional means for separating the hydrogen from other gases contained in the gas mixture formed, optionally at least one vessel for receiving the POS (II) containing SiH/SiFo$_1$ groups,

• and connected by at least one pipe for transferring POS (II) containing SiH/SiFo$_1$ groups in at least one hydrosilylation reactor B provided:

with means for recovering the vent gases, preferably combined with equipment for processing the vent gases in order to separate the hydrogen from the other gases, and, preferably, means for stirring the hydrosilylation reaction medium.

Such a device is designed to meet the productivity/viability/quality/ease of implementation and safety criteria, already mentioned above, of the specifications sheet.

Its advantages and its embodiment variants will emerge from the description which follows, with reference to the single figure attached, of an exemplary embodiment of the said device. The illustration of the process will also be completed by reporting tests performed in accordance with the process and using the device of the invention.

BRIEF DESCRIPTION OF THE DRAWING

The single figure attached is a schematic representation of an embodiment of a device for the continuous manufacture of multi-functional POSs by dehydrocondensation/hydrosilylation.

The device represented comprises a continuous dehydrocondensation reactor A and a batchwise hydrosilylation reactor B.

Reactor A consists essentially of a chamber 1, in the general shape of a hollow cylindrical column. This column is subdivided, on the one hand, into at least one—in this instance one—bottom reaction chamber 2 and, on the other hand, a top chamber 3 which forms part of the means for evacuation and rapid recovery of the gas and containing the optional means for separating out the hydrogen.

The bottom chamber 2 is provided with at least one—in this instance one—plate 40 which constitutes the base of a main compartment 5, intended to serve as the site for at least part of the dehydrocondensation of the POS (I). In this exemplary embodiment, the bottom chamber 2 of A is of the multi-stage type and includes at least one other lower stage —preferably one to three and, in this case three—in addition to that corresponding to the main compartment 5.

Each lower stage comprises a base, formed of at least one—in this instance one—plate 41, 42, 43, which defines, with the base of the upper adjacent stage, a compartment 6, 7 and 8 respectively, for the plates 41, 42, 43.

These plates 40 to 43 are, in fact, transverse partitions which delimit the compartments 5 to 8, the plate 43 defining, along with the base of column 1, a cap section 9, which is useful as a container for receiving the liquid reaction medium containing the POS (II) and connected to the reactor B by at least one transfer pipe 10.

Each plate 40, 41, 42, 43 comprises at least one overflow member (13, 13') (in this instance one) which allows the level of reaction liquid to be controlled. The reference 13 denotes the overflow of the plate 40 (main compartment 5). The references 13' denote the overflows of the plates 41, 42, 43 (lower compartments 6, 7 and 8).

The main compartment 5 is that into which the reactant supply pipe(s) 11 and 12 emerge(s). The overflow member 13 fitted in this main compartment 5 determines a given level for the liquid reaction medium in compartment 5. This overflow 13 places the compartment 5 in communication with the lower level of the bottom chamber 2, in which the transfer pipe 10 is located. In the present example, this lower level of the bottom chamber 2 corresponds to the cap section 9, which is separated from the main compartment 5 by three lower compartments 6, 7, 8. In addition, the main compartment 5 is in communication, at its upper part, with the top chamber 3.

The main compartment 5 may be supplied continuously with liquid reaction medium via the supply pipes 11 and 12. These pipes allow, for example, the POS (I) and the reactant HXR (e.g. alcohol) to be conveyed continuously as a mixture (solution) with the catalyst, preferably a platinum catalyst. These reactants empty out onto the plate 40, through which passes the overflow member 13 formed by a cylindrical tube pierced with an orifice 14, through which the excess liquid reaction medium may be evacuated from and conveyed into the lower compartment 6. This overflow tube 13 is axial relative to the chamber 1 of the reactor A and, preferably, extends upwards to place the compartment 5 in communication with the top chamber 3. To do this, the tube 13 extends through a dividing partition 15. The upper part of the tube 13, which emerges into the top chamber 3 above the partition 15, is provided with an opening 16. This tube 13 allows the rapid evacuation, into the top chamber 3, of the gas formed in the main compartment 5.

This tube 13 may, optionally, be fitted with at least one non-return valve in place of the orifice 16. In accordance with the invention, one or more tubes 13 for conveying the gases from the compartment 5 to the top chamber 3 may be provided.

The other overflow members 13', which are fitted in the plates 41, 42 and 43, also consist of cylindrical tubes whose axes are not aligned with each other. The height of the part of each tube 13' which extends from the base 41, 42, 43 determines the overflow level of reaction liquid above which this liquid will flow into the lower stage. Thus, each lower compartment 6, 7, 8, as well as the cap section 9, is intended to be supplied with liquid reaction medium via the overflow 13, 13' of the stage immediately above. The base of the lowest stage 8 communicates, via its overflow 13', with the cap section 9 of the reactor A, so as to allow the POS (II) to be collected. The residence time of the liquid reaction medium in each compartment may be regulated as desired by adjusting the withdrawal levels of the various plates 40, 41, 42, 43.

Drain pipes 17 are connected to the bottom part of each compartment 5, 6, 7, 8. These pipes 17 comprise valves which are represented symbolically on the diagram but are not referenced.

As regards the top chamber 3, it is delimited vertically by the partition 15 for separation with the bottom chamber 2 and by the top of column 1 of the reactor A. It should be pointed out that it forms part of the means for evacuation and rapid recovery of the gas released from the bottom chamber 2 during operation. This gas then passes, successively, through the orifice 14, the slot and the opening 16 of the tube 13.

In accordance with an advantageous characteristic of the invention, this top chamber 3 comprises means 18 for separating the hydrogen from the other components of the gas produced during the dehydrocondensation. In practice, these other components are vapours of volatile compounds (e.g. alcohol=reactant containing labile hydrogen). The means 18 thus advantageously consist of at least one condenser—in this case one—symbolized by a coil in the top chamber 3 and fed with coolant fluid according to a flow indicated by the arrows f represented on the diagram.

This diagram also shows, schematically, a pipe 19 for evacuating the hydrogen separated from the volatile vapours. This pipe 19 is connected to the upper part of column 1. It is moreover on this pipe 19, or in communication with this pipe, that, for example, means for continuously determining the degree of substitution of the SiH groups may be provided, so as to allow this degree to be regulated. These means preferably consist essentially of at least one hydrogen counter, and are advantageously associated with a computing unit. Such means, which are not referenced and not represented, may be connected to a system for continuously controlling and regulating the degree of substitution, also referred to as the degree of conversion. This control system may, for example', ensure the regulation by adjusting the supply flow rates and/or the residence times in the various stages by modifying the spill heights of each overflow 13, 13'.

The condensate, produced by means of the condenser 18, is recovered at the bottom of the bottom chamber 3, formed by the partition 15. This condensate may be withdrawn from the cap section of this chamber 3 via a pipe 20 connected to a storage reservoir and/or to a circuit for recycling the said condensate into the dehydrocondensation reaction (reactant containing labile hydrogen =HXR =e.g. alcohol). In such a variant of condensate recycling, the withdrawal pipe 20 would then be connected to the main compartment 5, so as to allow this compartment to be fed with recovered HXR. This variant corresponds to a preferred mode of the process and of the device according to the invention.

According to another variant of the invention, the base (or the partition) 15 is dispensed with. Under these conditions, the condensate of HXR recovered is collected directly in the main compartment 5 on the plate 40.

Such a multi-stage continuous reactor A provides large surface areas for exchange, which facilitate the dehydrocondensation and the evacuation of the gas formed containing the hydrogen and the volatile vapours. By multiplying the stages, this exchange surface is increased proportionately, and this may also be increased by adjusting the diameter of the column and of the separating plates 40 to 43.

Such a reactor A also makes it possible to optimize the free surface for escape of the hydrogen, thereby making it possible to prevent prohibitive foaming. It also offers the possibility of regulating, with precision, the degree of substitution of the SiH groups of the POS (I) with the functionalities $Fo_1$, by providing a control as presented above.

The means 18 for separating the hydrogen from the volatile vapours by condensation make it possible to control the gas flow rate and to recover and recycle the condensates, which has the incident effect of conveniently evacuating the heat of reaction, while at the same time correctly controlling the temperature of the reaction bulk.

The fact that this reactor A is not particularly bulky, is of simple structure and is inexpensive also constitutes a significant advantage.

Lastly, the safety is also optimized due to the fact that this reactor allows the transfer of the POS (II) into the reactor B, for the purposes of neutralization by hydrosilylation, once the asymptotic degree of conversion or substitution into $Fo_1$ is reached.

In the present example, the reactor B is a batchwise hydrosilylation reactor, denoted by the reference 21. It is a tank containing stirring means 22, formed, for example, by a propeller-stirrer. The bottom of this reactor 21 is connected to a pipe 23 which allows the POS (III) to be recovered once formed.

In its upper part, this reactor 21 contains means 24 for recovering the vent gases, consisting of a column which communicates with the inside of the reactor 21 and preferably containing equipment 25 for processing the vent gases in order to separate the hydrogen from the other gases. These other gases consist of the vapours of the volatile reactants, which may be the compound containing labile hydrogen (e.g. alcohol) and the unsaturated compound to be hydrosilylated (e.g. alkene).

Following the example of the means 18 of the reactor A, this equipment 25 consists of at least one—in this case one—condenser for the volatile vapours. This condenser is, for example, a coil (represented symbolically in the figure) through which runs a flow of coolant fluid, also indicated in the drawing. The condensates may be recovered at the bottom 25 of the condenser in order to be stored and/or recycled.

According to variants, the device according to the invention may comprise several reactors B operating either semi-continuously (alternate reaction/drainage sequences) or continuously, or alternatively a single reactor B designed to operate continuously.

By way of example of implementation of the process according to the invention in the device described above, mention may be made of the process whose operating conditions are as follows:

1. PRODUCTS USED:

Starting POS (I) =$(Me)_3SiO\text{-}[MeHSiO]_{50}Si(Me)_3$

Functional reactant containing labile hydrogen (HXR) =ethanol

Catalyst =Karstedt containing 10% platinum

Unsaturated compound - alkene =octene

Intermediate POS (II) =$(Me)_3\text{-}[SiOMeHSiO]_{15}\text{-}[Me(CH_2CHO)SiO]_{35} Si (Me)_3$ Final POS (III) =$(Me)_3SiO\text{-}[MeC_8H_{15}SiO]_{15}\text{-}[Me(CH_2CHO)SiO]_{35}Si(Me)_3$

2. OPERATING PARAMETERS:

Supply rate of POS (I) . . . 3.91 kg/h

Supply rate of ethanol + catalyst 3.92 kg/h

Platinum concentration in the ethanol . . . 24 ppm

Inlet temperature of POS (I) . . . 46° C.

Inlet temperature of ethanol + catalyst . . . 72° C.

Bulk temperature at foot of reactor A . . . 70 ° C.

Gas flow rate . . . 0.910 m$^3$

Degree of ethoxylation . . . 0.657

Amount of octene used (for 10 hours' running of the reactor A) . . . 34.6 kg

* out of 100 initial SiH groups, 65.7 were converted into SiOEt groups.

3. OPERATION:

The POS (I), on the one hand, and the ethanol + platinum catalyst, on the other hand, are introduced into the compartment 5 via the pipes 11 and 12 respectively. The supply flow rates are specified above.

The dehydrocondensation reaction takes place in the main compartment 5 with release of hydrogen and of volatiles which pass into the top chamber 3 via the tube 13. The volatiles are condensed by the condenser 18 and recovered by the pipe 20, and then recycled by conveying them into the main compartment 5. The hydrogen, separated from the condensable volatiles, escapes via the pipe 19 and is recovered.

After a certain supply period, the liquid reaction medium reaches its overflow level in the compartment 5. This level corresponds to a certain residence time, equal in this case to 3 min 30 s, and spills into the lower compartment 6. The liquid overflow volume of the compartment 5 is 470 ml, whereas, for the other three compartments (stages) 6, 7, 8, this volume is 630 ml. The system of cascade overflowing of the liquid reaction medium continues in the lower compartments 7 and 8 and, at the end, the POS (II) is collected in the cap section 9, the degree of conversion of this POS (II) being 0.66. This degree is regulated by means of a control system comprising a hydrogen sensor and a computing unit which continuously determines the degree of conversion, thereby making it possible to regulate this degree by adjusting the flow rates during operation. The spill heights of the plates 40 to 43 may also be adjusted.

The POS (II) thus obtained is transferred continuously via the pipe 16 into the reactor B, in order to be subjected to the hydrosilylation which makes it harmless and converts it into POS (III). The ethanol and octene which have evaporated are condensed, then recovered and optionally recycled by virtue of the means 23. The POS (III) is recovered by draining the reactor 20 by means of the pipe 22.

The invention is not limited to the example described and represented, since various modifications may be made thereto without departing from the scope thereof.

What is claimed is:

1. A process for the continuous or semi-continuous manufacture of multifunctional polyorganosiloxanes (POS)(III), from a POS (I) comprising SiH groups and according to a reaction mechanism involving a dehydrocondensation which allows functionalization by the functionality ($Fo_1$) and a hydrosilylation of at least one unsaturated compound which is a precursor of a functionality ($Fo_2$) on the POS (III), said process comprising the steps of:
    a) continuously supplying with reactants at least one continuous reactor A comprising a chamber (1) comprising a top chamber (3) and at least one bottom reaction chamber (2) provided with at least one plate (40) which constitutes the base of a main compartment (5) comprising an upper part and a lower part, the main compartment (5) being in communication with the top chamber (3) via its upper part, the reactants being supplied by at least one pipe (11, 12) emerging into the main compartment (5), the reactants comprising:
        at least one POS (I) containing SiH groups,
        at least one functional reactant of formula: HXR containing labile hydrogen, wherein X is O or S, and R is a linear or branched alkyl radical having from 1 to 15 carbon atoms, and
        a catalyst comprising a transition metal, said reactor A being the site of a dehydrocondensation leading:
    to a liquid reaction medium comprising a POS (II) having residual SiH groups and groups $SiFo_1(Fo_1=XR)$,
    to reactant HXR, and
    to a gas containing hydrogen and optionally, gaseous reactant HXR,
    b) allowing a continuous removal and recovery, from the reactor A, of the gas containing hydrogen as it is formed, with evacuation means, comprising the top chamber (3),
    c) collecting the liquid reaction medium, provided that this medium contains the POS (II) containing SiH/$SiFo_1$ groups and the catalyst, with at least one overflow member (13) in the main compartment (5), said overflow member placing said compartment in communication with the lower level of the bottom chamber (2),
    d) transferring the liquid reaction medium from the reactor A to at least one reactor B, with at least one pipe connecting the lower level of the bottom chamber (2) to the reactor B,
    e) carrying out a hydrosilylation of at least one unsaturated functional compound by the residual SiH groups of the POS (II), in the reactor B, optionally provided with stirring means (22), so as to obtain the POS (III) containing $SiFo_1$ and $SiFo_2$ groups, separating hydrogen as it is formed from other gases with means (24) providing the reactor B, for recovering vent gases, and
    f) recovering the POS (III) containing $SiFo_1/SiFo_2$ groups thus formed.

2. A process according to claim 1, wherein step b) further comprises separating the hydrogen, with means contained in the top chamber (3).

3. A process according to claim 1, wherein the bottom chamber (2) is a multi-stage chamber comprising:
    further to the lower level, at least one lower stage, each stage comprising a base formed by at least one plate (41, 42, 43) which defines, with the base of an upper adjacent stage, a compartment (6, 7, 8), and
    at least one overflow member (13') which allows a level of liquid to be adjusted, each lower compartment (6, 7, 8) being intended to be supplied with liquid reaction medium via the overflow member (13, 13') of the stage immediately above, and the base (43) of the lowest stage communicating, via its overflow member, with a cap section (9) providing the reactor A, so as to allow the POS (II) to be received.

4. A process according to claim 2, wherein hydrogen is separated from other vent gases in the reactor A and the reactor B, by separating means essentially consisting in at least one volatile vapor condenser.

5. A process according to claim 1, wherein a degree of substitution of the SiH groups is continuously determined and controlled with means comprising at least one hydrogen counter associated with a compound unit.

6. A process according to claim 1, wherein:
    a degree of substitution of the SiH groups with $Fo_1$ is measured or calculated, and
    the POS (II) is transferred from the reactor A to the reactor B once the degree of substitution of the SiH groups with $Fo_1$, expressed in mol%, is greater than or equal to 45.

7. A process according to claim 1, wherein step e) is carried out in several reactors B, operating either semi-continuously, by alternate steps comprising reaction and drainage, or continuously.

8. A process according to claim 1, wherein step e) is carried out continuously in one reactor B.

9. A process according to claim 1, wherein the gas produced by the dehydrocondensation comprises, besides hydrogen, HXR in vapor form, said gas being subjected to a treatment for separating hydrogen.

10. A process according to claim 9, wherein said separation is made by condensation of the HXR vapors, the transition metal catalyst being platinum, and R having 1 to 6 carbon atoms.

11. A process according to claim 1, wherein the reactor A is simultaneously supplied with the POS (I) containing SiH and with the reactant HXR, the catalyst being included in the POS (I) or the reactant HXR.

12. A process according to claim 1, wherein at least one of the starting reactants selected from the group consisting of POS (I), HXR and catalyst, is preheated to a temperature of between 30 and 100° C.

13. A process according to claim 12, wherein said temperature is of between 40 and 80° C.

14. A process according to claim 6, wherein the degree of substitution is of between 60 and 70.

15. A process according to claim 1, wherein the step of hydrosilylation of at least one unsaturated compound which is a precursor of $Fo_2$ is carried out according to a continuous mode.

16. A process according to claim 1, wherein:

the multifunctional POSs (III) comprises, per molecule:

α) at least one functional siloxy unit (I) of the formula:

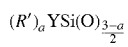

wherein R' a $C_1$–$C_6$ alkyl radical, Y is a $C_1$–$C_{15}$ alkoxy radical, and a equals 0, 1 or 2, and β) at least one other functional siloxy unit (II):

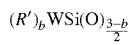

wherein b=0, 1 or 2 and W is a $C_2$–$C_{30}$ organic group, linked to the silicon via an Si—C bond, W being selected from the group consisting of:

(i) a linear or branched alkyl group comprising at least 7 carbon atoms, (2i) a linear or branched $C_2$–$C_{20}$ alkenyl group containing one or more double bonds in or at the end(s) of the chain(s), said double bonds being optionally conjugated or combined with at least one oxide ether or a thioether group located in an α position, (3i) an unsaturated aliphatic mono- or bicyclic group containing 5 to 20 cyclic carbon atoms and one or two ethylenic double bond(s) in the ring, optionally substituted with one or two linear or branched $C_1$–$C_3$ alkyl group(s), said cyclic group optionally being linked to the silicon via a linear or branched $C_2$–$C_{10}$ alkylene radical, (4i) a mercaptoalkyl group of formula —R$^1$—S—A  (4i)

wherein:

R$^1$ represents a linear or branched $C_2$–$C_{10}$ alkylene radical, optionally comprising at least one oxygen-containing hetero atom or an alkylene-cycloalkylene radical in which the alkylene part is a linear or branched $C_2$–$C_{10}$ alkylene radical and the cyclic part contains 5 to 10 carbon atoms and is optionally substituted with one or two linear or branched $C_1$–$C_3$ alkyl group(s), and A is hydrogen or a masking group M connected to S via a labile bond for the replacement of M with H or the creation of an active species —R$^1$—S·:, (5i) a group comprising a polysulphuric species and corresponding to the following formula:

wherein:

x=1 to 6, R$^2$ having the definition as R$^1$ above, and R$^3$ is a linear or branched $C_1$–$C_{10}$ alkyl, (6i) a group containing at least one ring, in which at least one of the elements is a sulphur atom, and corresponding to the formulae below:

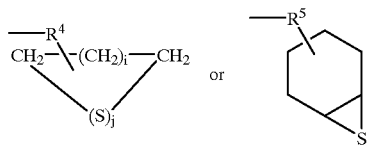

wherein:

i=0, 1 or 2 and j=1 to 6, R$^4$ and R$^5$ are divalent radicals as defined above for R$^1$, and (7i) a sulphoxide group of formula:

wherein the symbol R$^1$ and M have the definitions given above for formula (4i), and γ) optionally, at least one unit(III) of the formula:

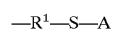

wherein =0, 1, 2 or 3, d=0 or 1 and c+d≦3;

the reactant containing labile hydrogen is an alcohol ROH with R=$C_1$–$C_{15}$ alkyl, and the catalyst comprises platinum.

* * * * *